March 14, 1967  H. I. JOHNSON ET AL  3,308,848
FLUID POWER TRANSMISSION

Filed July 27, 1964  2 Sheets-Sheet 2

Harold I. Johnson
Orrin A. Wobig
INVENTORS

BY
ATTORNEYS

United States Patent Office 3,308,848
Patented Mar. 14, 1967

3,308,848
FLUID POWER TRANSMISSION
Harold I. Johnson and Orrin A. Wobig, Seabrook, Tex., assignors to the United States of America as represented by the Administrator of the National Aeronautics and Space Administration
Filed July 27, 1964, Ser. No. 385,526
10 Claims. (Cl. 137—615)

The invention described herein may be manufactured and used by or for the government of the United States of America for governmental purposes without the payment of any royalty therein or therefor.

This invention relates generally to fluid power transmission and more particularly to a method and apparatus for transmitting power in the form of fluid flow through a fluid-supported bearing.

It is the purpose of this invention to permit the transmission of appreciable amounts of power in the form of a flow of compressed gas across an essentially frictionless gas-supported bearing without noticeably affecting the operation of the bearing. This is a particularly desirable feature in instances where it is necessary to supply gas under pressure through ducts and mechanisms which involve rotation or oscillatory motion and where it is undesirable or impossible to use flexible hose for supplying the fluid power.

Various types of training devices, for example, have been developed for simulating the motions of aerospace vehicles and the dynamics of space flight which utilize a movable member supported on an air bearing and supplied with energy for driving the movable member in yaw, pitch, and roll maneuvers. This energy is usually supplied by compressed gas bottles or by liquid or solid propellants mounted aboard the movable member. These methods of supplying energy have serious disadvantages, however, since the limited amount of compressed gas or other propellant which may be carried strictly limits the operating time of the trainer and the loss of weight as the gas is used up may cause an intolerable shift in the center of gravity of the movable member which normally is located in the center of the floating bearing member. In other instances the energy is supplied by flexible lines communicating with a fluid pressure source off-board the movable member. The use of flexible lines, however, imposes extra forces on the moving simulator caused by the twisting and weight of the lines which destroys the validity of space flight simulation.

In conventional practice, fluid-supported bearings are designed with closely fitted bearing surfaces between which a film of air or other fluid is drawn or forced under pressure. In some instances, bearings have been designed with a passage through the fluid-supported bearing member whereby fluid may be delivered through the passage for the purposes of doing useful work, as, for example, spinning a gyro rotor which is mounted in an air-supported bearing. The nature of these devices is such, however, that the floating bearing is generally limited to but one degree of freedom. Furthermore, it is characteristic of these devices that the function of the power transmitting fluid is coupled with the lift function of the fluid which provides the lift for the supported bearing member. It has therefore been impossible to modulate the power delivered through the bearing without affecting the floating of the bearing which is, of course, a prime consideration, and particularly where the fluid film must not only support the weight of the floating bearing but also a payload carried thereon. In addition, it strictly curtails the liimts of fluid power, particularly the lower limit of the power which may be transmitted.

The appaartus and method of this invention is defined to circumvent the problems in the prior art devices and provides separate air supplies at different pressure levels for the separate functions of fluid power transmission and support for the floated bearing member. The apparatus comprises a socket provided with small holes distributed in annular zones of the socket and communicating with a supply of high pressure gas for supporting a close-fitting bearing member in the socket on a cushion of air. The base of the socket is also provided with a larger centrally located opening which communicates with a supply of compressed gas maintained at lower pressure than that for lifting the fluid-supported bearing member. The supported bearing member is formed with a flow passage extending therethrough and terminating in an enlarged recess of corresponding area with the central socket opening which is normally in alignment therewith. Consequently, compressed gas delivered through the central socket opening will be in fluid communication with the flow passage through the supported bearing member for a substantial variation in position of the supported member relative to the socket which will permit three degrees of freedom for the supported bearing member. The magnitude of freedom permitted the supported member is limited by the sum of the maxmum dimensions of the central socket opening and the recess at the terminal end of the flow passage through the supported bearing member.

To avoid disturbanes in the fluid film between the bearing members which would result in undesirable "chatter" the pressure of the fluid power transmission supply is limited to a value which is less than the pressure of the compressed gas which provides the lift for the bearing. Since there are two separate supplies of compressed gas it is therefore possible to modulate the power delivered through the bearing or to reduce it substantially to zero without affecting the floating of the bearing.

Other objects and many of the attendant advantages of this invention will be readily appreciated as the same become better understood by reference to the following detailed description when considered in connection with the accompanying drawings in which like reference numerals designate like parts throughout the figure thereof and wherein.

Figure 1:
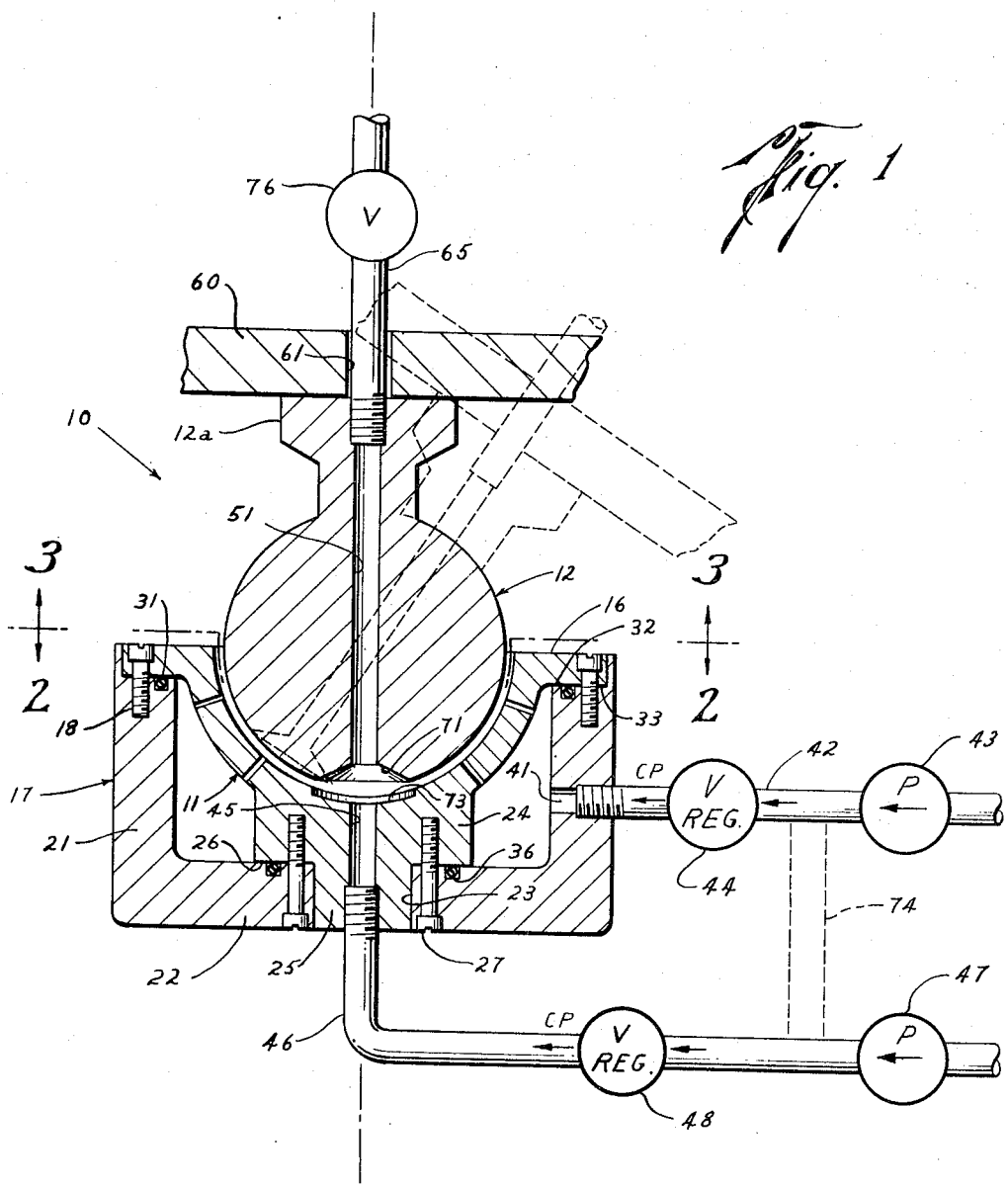
FIG. 1 is a schematic setcional view of the apparatus of this invention for transmission of fluid power through a fluid-supported bearing.
Figure 2:
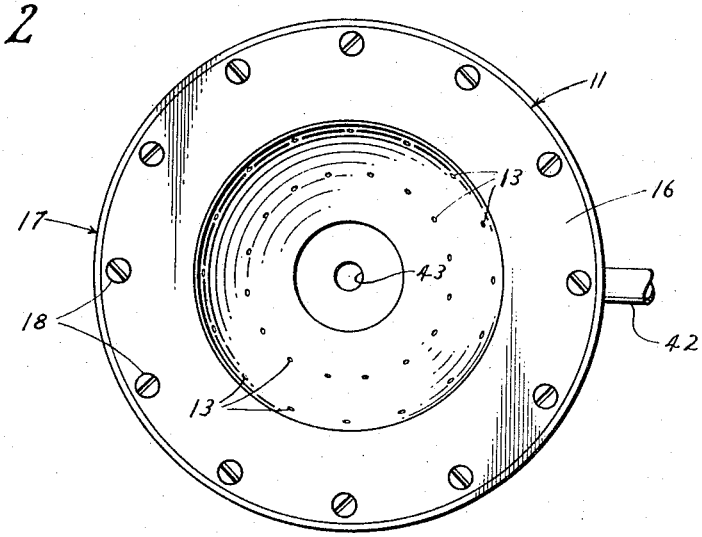
FIG. 2 is a top plan view of the bearing socket in the apparatus of FIG. 1.
Figure 3:
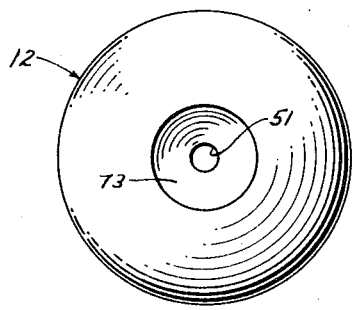
FIG. 3 is a bottom view of the fluid-supported bearing member in the apparatus of FIG. 1.

Referring more particularly to the drawings, there is shown in FIG. 1 an apparatus 10 for transmitting fluid power through a fluid-supported bearing in accordance with the invention. The bearing comprises a socket member 11 and a cooperating bearing member 12 which represents the fluid-supported member and which is configured to provide a close fit with the socket 11. As shown in the drawings, the socket 11 is cup-shaped and provided with numerous small holes 13 which are arranged in spaced annular zones of the cup. The holes 13 provide the openings in the socket through which fluid is deliverable for floating the bearing 12 on a thin film of gaseous fluid.

The socket is also provided with an annular flange 16 at the top thereof which is provided with numerous screw holes whereby the socket may be attached to one end of a cylindrical chamber member 17 by means of screws 18. Preferably, the chamber member which is circular in cross-section, if formed with an internal shoulder 32 for seating the flange 16. The chamber member is formed by a cylindrical wall 21 and a transverse base member 22 which is provided with a central axial opening 23 in the base 22 for receiving the base 24 of the socket 11. The socket base, which depends vertically from the socket, is cylindrical in shape with a lower portion 25 of reduced diameter which provides an annular shoulder 26. The diameter of the portion 25 corresponds to the diameter of the opening in the chamber base 22 to provide a close fit therein. The socket is bolted to the cylinder base by screws 27 which are threaded into the shoulder 26.

To insure fluid-tight seal connections between the socket and the cylindrical chamber, and O-ring 31 is seated in an annular groove in the top edge 32 of the chamber member for sealing engagement with the under surface 33 of the socket flange 16. A fluid-tight seal is also provided at the bottom connection of the socket and chamber member by an O-ring 36 which is seated in an annular groove concentric about the opening 23 in the bottom of the chamber member. The O-ring 36 abuts the shoulder 26 of the socket base to form a fluid-tight seal therewith. The side wall 21 of the cylindrical chamber member 17 is provided with an opening 41 which is internally threaded for receiving an externally threaded conduit 42. The conduit 42 leads to a compressed air supply 43 such as a compressed air cylinder or pump which provides high pressure fluid for delivery through a pressure regulating and reducing valve 44 into the chamber member 17 and through the numerous socket openings 13 for supporting the floating bearing member 12. The valve 44 permits adjustment of pressure to compensate for different size loads.

In addition to the numerous small openings 13, the socket is also provided with a central opening 45 which extends axially through the socket base. The opening 45 is internally threaded at its lower end for receiving an externally threaded conduit 46 which leads to a compressed air supply 47. The supply 47 provides the fluid for fluid-power transmission through the bearing. A pressure regulating and reducing valve 48 is provided in the conduit 46 for maintaining the pressure of the transmitted fluid at a value substantially less than the pressure of fluid which is delivered to the chamber 11.

The bearing member 12, which is illustrated in the drawings as being spherical in shape, is provided with a diametral bore 51 which extends completely through the bearing member 12 and an appendage 12a of the bearing which provides means for supporting a payload member 60. The member 60 is provided with an opening 61 which is aligned with the bore 51. The diametral opening 51 constitutes a flow passage for receiving fluid under pressure from the pressure supply whereby fluid power may be transmitted through the bearing to a point of utility on the payload for the purpose of performing useful work, as for example, to reaction jets on a space vehicle simulator. The flow passage 51 is internally threaded at its upper end for receiving an externally threaded conduit 65 which extends through the opening 61 and leads to the reaction jets on the payload, or to a place for performing work. It its lower end the flow passage 51 is enlarged to form a conical recess 71 coaxial with the flow passage 51.

The socket opening 45 is also provided at its upper end with an enlarged recess 73 which is symmetrical with respect to the axis of the opening 45 and the vertical socket axis. The socket recess 73 and the conical recess 71 of the floating bearing member are preferably equal in area. Consequently, in disposition of the floating bearing in the socket 11 when there is zero pitch or tilt of the payload 60, the flow passage 51 is aligned with the socket opening 45 and flow conduit 46, and the conical recess 71 is superposed over the recess 73 and is in coaxial alignment therewith.

It is to be noted that for purposes of illustration the size of the holes 13 in the socket 11 is much exaggerated since only a relatively small volume of air is required for supporting the spherical bearing member 12. In comparison, the volume of air which is transmitted through the flow passage in the spherical bearing member is approximately ten thousand times greater.

It should also be understood, of course, that the invention is not limited to the spherical type of bearing but is adaptable to a variety of other types where freedom is desired about more than one axis. Also, while the provisions of two separate air supplies for supporting the bearing and for transmission of power is preferred, it is contemplated that a single air supply might also be employed, as shown by the conduit 74 represented by dashed lines in FIG. 1 which connects the pump 47 with the conduit 42. An adjustable pressure reducing valve, however, must be installed in each conduit 46 and 42 for reducing and regulating the pressure of the fluid which is transmitted through the bearing and that which is delivered to the chamber 11. The area of the recesses 71 and 73 is, of course, commensurate with the degree of pitch and roll desired for the movable payload as shown by the dashed lines in FIG. 1. One model of the invention which has been constructed provides for pitch and roll of 35 degrees.

It is also possible to regulate the pressure of fluid flow, and hence the power delivered through the bearing, by locating a control valve aboard the payload 60, as for example an on-off valve or a proportional valve 76 installed in the conduit 65. This is preferred in many instances since it provides a control of fluid power from directly aboard the movable payload.

It has been noted that where a floating bearing is used to support a payload, the device is subject to "chatter" to the extent that its operation oftentimes is seriously impaired. It has been determined that the pressure of air which is delivered through the small socket holes is greatly reduced on passage through the holes. By mantaining the pressure of air which is transmitted through the flow passage 51 at a value less than this reduced pressure, the problem of "chatter" is avoided. Consequently, the power transmitted through the bearing may be modulated over a wide range without affecting the floating of the spherical member 12. In other words, there is a decoupling of the power transmitting function from the lift function for supporting the floating bearing which is not a feature of the prior art devices. For operational purposes, the transmitted fluid pressure is maintained at a level less than the pressure of the air film which supports the bearing member 12 and is approximately 40% of the pressure communicated to chamber 11.

It should therefore be seen that the apparatus and method disclosed herein permit motion of the floating bearing and payload with three degrees of freedom. The magnitude of the motion in pitch or yaw is limited by suitable stops (not shown) which could be mounted on surrounding structure or the socket flange 16, for example. The magnitude, however, should not be so great that the recesses 71 and 73 in the spherical bearing and the socket, respectively, become positioned out of fluid communication with one another.

It should also be understood that the foregoing disclosure relates only to preferred embodiments of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. A device for transmitting fluid power through a fluid-supported bearing comprising:
 a first bearing member in the form of a cup having an inner bearing surface, said first bearing member having an opening in the bottom thereof;
 a second bearing member having a convex surface conforming to the bearing surface of the cup and adapted to be supported therein, said second bearing member having a flow passage extending therethrough;
 means for supplying air under pressure at a plurality of points between said first bearing member and said second bearing member to support the second bearing member on a flowing film of air; and means for supplying air under pressure through the opening in the bottom of the cup to said flow passage in the second bearing member whereby controlled amounts of fluid power may be transmitted through the fluid bearing structure without affecting the floating of the second bearing member.

2. A device for transmitting fluid power through a fluid-supported bearing comprising:
   a first bearing member in the form of a cup having an inner bearing surface, said first bearing member having an opening in the bottom thereof;
   a second bearing member having a convex surface conforming to the inner surface of the cup and adapted to be supported therein, said second bearing member having a flow passage extending therethrough;
   means for introducing air at a given pressure level between said first bearing member and said second bearing member to float the second bearing member on a film of air; and
   means for supplying air through the opening in the bottom of the cup and through said flow passage in the second bearing member at any pressure which is less than the pressure of air which floats the second bearing member whereby controlled amounts of fluid power may be transmitted through the fluid bearing structure without affecting the floating of the second bearing member.

3. A structure for freely supporting a payload on an essentially frictionless fluid bearing which will permit at least three degrees of freedom for the payload and the transmission of fluid power through the frictionless fluid bearing, said structure comprising:
   a supporting element in the form of a spherical cup having an inner concave bearing surface;
   a supported bearing element having a spherical bearing surface conforming to the inner bearing surface of the cup and adapted to be supported therein, said payload being directly mountable on said supported bearing element;
   a first supply of fluid under pressure;
   means for communicating fluid from said first supply of fluid pressure between said cup and supported bearing element at a plurality of points to float the supported bearing element;
   a second supply of fluid under pressure; and
   means for communicating fluid from said second supply of fluid through said supporting and supported bearing elements at any pressure less than the pressure of fluid which floats the supported element to thereby accomplish transmission of controlled amounts of fluid power through the frictionless fluid bearing without affecting the operation of the bearing.

4. A structure for freely supporting a payload on an essentially frictionless fluid bearing which will permit three degrees of freedom for the payload and the transmission of fluid power through the frictionless fluid bearing, said structure comprising:
   a supporting bearing element in the form of a cup having an inner-bearing surface and a plurality of openings through the wall of the cup and the bearing surface which are symmetrically arranged about the vertical axis of the cup;
   a supported bearing element having a convex surface conforming to the bearing surface of the cup and adapted to be supported therein, said second bearing element having a flow passage extending therethrough and said payload being directly mountable on said supported bearing element;
   a first supply of fluid under pressure;
   means for communicating fluid from said first supply of fluid between said cup and supported bearing element through said plurality of openings to float the supported bearing element on a fluid film;
   means for adjusting the pressure of fluid which is communicated through said plurality of openings;
   a second supply of fluid under pressure;
   means for communicating fluid from said second supply of fluid through said flow passage from the bottom of the supporting bearing element to the flow passage of said supported bearing element; and
   valve means for maintaining the pressure of fluid which is communicated through said bearing elements at any pressure less than the pressure of fluid which floats the supported element to thereby accomplish transmission of controlled amounts of fluid power through the frictionless bearing without affecting the operation of the bearing.

5. A structure for freely supporting a payload on an essentially frictionless fluid bearing which will permit three degrees of freedom for the payload and the transmission of fluid power through the frictionless fluid bearing, said structure comprising:
   a supporting bearing element in the form of a cup having an inner bearing surface and a recess in the bottom of the bearing surface which communicates with an opening through the supporting bearing element, said opening being of smaller cross-sectional area than said recess;
   a supported bearing element having a convex surface conforming to the bearing surface of the cup and adapted to be supported therein, said second bearing element having a flow passage extending therethrough and terminating in a recess in the convex surface which is of greater area than the cross-sectional area of the flow passage;
   a first supply of fluid under pressure;
   means for communicating fluid from said first supply of fluid pressure between said cup and supported bearing element at a plurality of points to float the supported bearing element on a fluid film;
   means for adjusting the pressure of fluid which is communicated to said plurality of points;
   a second supply of fluid under pressure;
   means for communicating fluid from said second pressure supply through the opening in the bottom of said supporting bearing element to the flow passage of said supported bearing element; and
   means for maintaining the pressure of fluid which is communicated through said bearing elements at any pressure less than the pressure of fluid which floats the supported element to thereby accomplish transmission of controlled amounts of fluid power through the frictionless bearing without affecting the operation of the bearing.

6. In an air bearing for freely supporting a payload for movement with three degrees of freedom:
   a supporting bearing element in the form of a cup having an inner spherical bearing surface, said bearing element having an opening through the bottom thereof which communicates with a recess in the bearing surface which is of larger area than the cross sectional area of the opening;
   a supported bearing element having a spherical convex surface conforming to the bearing surface of the cup and adapted to be supported therein, said second bearing element having a flow passage extending therethrough and communicating with a recess in the convex surface which is of greater area than the cross sectional area of the flow passage;
   means for communicating fluid from a first source of fluid pressure between said cup and said supported bearing element at a plurality of points for floating the supporting bearing element on a fluid film; and
   means for communicating fluid from a second source of fluid pressure through the opening in the bottom of said supported bearing element to the flow passage of the supported bearing element for the transmission of controlled a mounts of fluid power through the air bearing throughout the range of movements of the payload wherein said recesses in the cooperating bearing surfaces are disposed in superposed relation one to another.

7. In a structure for freely supporting a payload for movement with three degrees of freedom:
 a supporting bearing element in the form of a cup having an inner spherical bearing surface, said bearing element having an opening through the bottom thereof which communicates with a recess in the bearing surface which is of larger area than the cross-sectional area of the opening;
 a supported bearing element having a spherical convex surface conforming to the bearing surface of the cup and adapted to be supported therein, said second bearing element having a flow passage extending therethrough and communicating with a recess in the convex surface which is of greater area than the cross sectional area of the flow passage;
 means for communicating fluid from a first source of fluid pressure between said cup and said supported bearing element at a plurality of points for floating the supported bearing element on a fluid film; and
 means for communicating fluid from a second source of fluid pressure through the opening in the bottom of said supporting bearing element to the flow passage of the supported bearing element for the transmission of controlled fluid power through the air bearing throughout the range of movements of the payload wherein said recesses in the cooperating bearing surfaces are disposed in superposed relation one to another; and
 means for maintaining the pressure of said second source of fluid at any pressure which is less than the pressure in the fluid film between the bearing surfaces.

8. An air bearing comprising supported and supporting bearing members with inter-fitting bearing surfaces adapted to be separated by a film of flowing air, said supporting bearing member having a large opening through the bearing surface which provides a flow passage for transmission of fluid power and said supported bearing member having a flow passage therethrough which is normally disposed in fluid communication with the flow passage through the supporting member;
 means connectable with a source of air pressure for supplying air under pressure at a plurality of points between said first bearing member and said second bearing member to support the second bearing member on a flowing film of air;
 means connectable with a source of air pressure for communicating air under pressure through the flow passages in the bearing members; and
 valve means mounted on the supported bearing element for controlling the flow of air and the transmission of fluid power through said flow passages.

9. An air bearing comprising supported and supporting bearing elements with inter-fitting bearing surfaces normally separable by a film of flowing air, said supporting bearing element having a large opening through the bearing surface which provides a flow passage for transmission of fluid power and said supported bearing element having a flow passage therethrough which is normally disposed in fluid communication with the flow passage through the supporting element;
 means connectable with a source of air pressure for supplying air under pressure at a plurality of points between said supporting bearing element and said supported bearing element to float the supported bearing element on a flowing film of air;
 means connectable with a source of air pressure for communicating air under pressure through the flow passages in the bearing elements; and
 means for maintaining the pressure of air which is communicated through said flow passages in the bearing elements at any pressure less than the pressure of fluid which floats the supported bearing element.

10. An air bearing comprising supported and supporting bearing elements with inter-fitting bearing surfaces normally separable by a film of flowing air, said supporting bearing element having a large opening through the bearing surface which provides a flow passage for transmission of fluid power and said supported bearing element having a flow passage therethrough which is normally disposed in fluid communication with the flow passage through the supporting element;
 means connectable with a source of air pressure for supplying air under pressure at a plurality of points between said supporting bearing element and said supported bearing element to float the supported bearing element on a flowing film of air;
 means connectable with a source of air pressure for communicating air under pressure through the flow passages in the bearing elements; and
 means for maintaining the pressure of air which is communicated through said flow passages in the bearing elements at any pressure less than the pressure of fluid which floats the supported bearing element; and
 valve means mounted on the supported bearing element for controlling the flow of air through the bearing elements.

References Cited by the Examiner

UNITED STATES PATENTS

| | | | |
|---|---|---|---|
| 2,015,396 | 9/1935 | Drissner | 137—616.7 |
| 2,086,896 | 7/1937 | Carter | 74—5.43 |
| 2,695,198 | 11/1954 | Brugger | 308—9 |
| 2,695,199 | 11/1954 | Blizard | 308—9 |
| 2,752,197 | 6/1956 | Marco | 239—249 |
| 2,869,901 | 1/1959 | Czerwinski | 285—181 |
| 3,167,086 | 1/1965 | Michalski | 137—315 |
| 3,195,963 | 7/1965 | Anderson | 308—9 |

WILLIAM F. O'DEA, *Primary Examiner.*

D. R. DONOVAN, *Examiner.*